(12) United States Patent
Malecki et al.

(10) Patent No.: US 9,710,710 B2
(45) Date of Patent: Jul. 18, 2017

(54) SYSTEM AND METHOD FOR AUTONOMOUS VEHICLE CONTROL

(71) Applicant: ReconRobotics, Inc., Eden Prairie, MN (US)

(72) Inventors: Robert S. Malecki, St. Paul, MN (US); Lue Her, Lake Elmo, MN (US); Ryan S. Thompson, St. Paul, MN (US); Anthony H. Giang, Lexington, MN (US)

(73) Assignee: Xollai Inc., Minneapolis, MN (US)

( * ) Notice: Subject to any disclaimer, the term of this patent is extended or adjusted under 35 U.S.C. 154(b) by 0 days.

(21) Appl. No.: 14/823,735

(22) Filed: Aug. 11, 2015

(65) Prior Publication Data

US 2016/0202694 A1 Jul. 14, 2016

Related U.S. Application Data

(63) Continuation of application No. 13/664,140, filed on Oct. 30, 2012, now abandoned, which is a (Continued)

(51) Int. Cl.
*G05D 1/00* (2006.01)
*G05D 1/10* (2006.01)
(Continued)

(52) U.S. Cl.
CPC .......... *G06K 9/0063* (2013.01); *G01C 21/165* (2013.01); *G05D 1/0011* (2013.01);
(Continued)

(58) Field of Classification Search
CPC .... G05D 1/0011; G05D 1/0266; G05D 1/021; G05D 1/101; G05D 1/00; G01C 21/165;
(Continued)

(56) References Cited

U.S. PATENT DOCUMENTS 5,235,513 A 8/1993 Velger et al.
5,455,591 A 10/1995 Hui
(Continued)

FOREIGN PATENT DOCUMENTS

EP  1 983 397 A2  10/2008
FR  2 727 082 A1  6/1996

OTHER PUBLICATIONS

Mak, Lin Chi, et al., "A 6 DoF Visual Tracking System for a Miniature Helicopter," *2nd International Conference on Sensing Technology*, Nov. 26-28, 2007 (pp. 32-37).

(Continued)

*Primary Examiner* — Tuan C. To
(74) *Attorney, Agent, or Firm* — Christensen, Fonder, Dardi & Herbert PLLC

(57) ABSTRACT

A system for localizing an autonomous vehicle to a target area can include a position indicator adapted for association with the vehicle in a three dimensional configuration, a detection device configured to detect the position indicator, a computation device configured to compute a position of the vehicle based on the detected position indicator and the relationship of the configuration to the vehicle orientation, a transmitter configured to receive information from the computation device and produce a signal carrying the information, a receiver configured to receive the signal from the transmitter and filter the information therefrom, and a control system configured for association with and control of one or more directional control components of the vehicle, the control being based on the information received from the receiver relating to localizing the vehicle to the target area. A method of for localizing a vehicle to a target area is also disclosed.

15 Claims, 17 Drawing Sheets

Related U.S. Application Data continuation of application No. 12/642,605, filed on Dec. 18, 2009, now Pat. No. 8,301,326.

(60) Provisional application No. 61/203,246, filed on Dec. 19, 2008.

(51) Int. Cl.
  *G01C 21/16* (2006.01)
  *G05D 1/02* (2006.01)
  *G06K 9/00* (2006.01)
  *G05D 1/06* (2006.01)
  *G06T 7/00* (2017.01)
  *G06T 7/70* (2017.01)

(52) U.S. Cl.
  CPC ............ *G05D 1/021* (2013.01); *G05D 1/0206* (2013.01); *G05D 1/0676* (2013.01); *G05D 1/101* (2013.01); *G06T 7/004* (2013.01); *G06T 7/70* (2017.01); *G06T 2207/30204* (2013.01)

(58) Field of Classification Search
  CPC .............. G01C 21/16; B64C 2201/141; B64C 2201/00; B64C 2201/127; G06T 3/4038; G07C 5/008
  See application file for complete search history.

(56) References Cited

U.S. PATENT DOCUMENTS

| | | | |
|---|---|---|---|
| 5,867,800 A | 2/1999 | Leif | |
| 6,058,339 A * | 5/2000 | Takiguchi | G05D 1/0234 180/169 |
| 6,151,539 A | 11/2000 | Bergholz et al. | |
| 6,154,693 A | 11/2000 | Aberschitz et al. | |
| 6,760,488 B1 | 7/2004 | Moura et al. | |
| 7,054,716 B2 | 5/2006 | McKee et al. | |
| 7,302,316 B2 * | 11/2007 | Beard | G05D 1/101 244/75.1 |
| 7,439,873 B2 | 10/2008 | Tillotson | |
| 7,539,557 B2 | 5/2009 | Yamauchi | |
| 7,633,527 B2 * | 12/2009 | Pilu | H04N 5/23222 348/211.4 |
| 7,706,572 B2 | 4/2010 | Hattori et al. | |
| 7,725,257 B2 * | 5/2010 | Strelow | G01C 21/005 348/117 |
| 7,805,244 B2 * | 9/2010 | Park | G01C 21/165 244/158.1 |
| 7,904,247 B2 * | 3/2011 | Nakamori | G06K 9/00805 180/168 |
| 7,908,041 B2 | 3/2011 | Cheok et al. | |
| 7,974,460 B2 * | 7/2011 | Elgersma | G05D 1/101 382/104 |
| 8,019,490 B2 | 9/2011 | Ferren et al. | |
| 8,050,863 B2 * | 11/2011 | Trepagnier | B60W 30/00 180/167 |
| 8,126,642 B2 | 2/2012 | Trepagnier et al. | |
| 8,174,562 B2 | 5/2012 | Hartman | |
| 2006/0074557 A1 | 4/2006 | Mulligan et al. | |
| 2006/0089763 A1 * | 4/2006 | Barrett | G05D 1/0061 701/23 |
| 2007/0093945 A1 * | 4/2007 | Grzywna | G05D 1/101 701/23 |
| 2008/0071476 A1 | 3/2008 | Hoshizaki | |
| 2008/0284643 A1 | 11/2008 | Scherzinger et al. | |
| 2009/0096664 A1 | 4/2009 | Carroll et al. | |
| 2009/0122133 A1 | 5/2009 | Hartman | |
| 2010/0004802 A1 | 1/2010 | Bodin et al. | |
| 2010/0108809 A1 | 5/2010 | Bouldin et al. | |
| 2010/0152933 A1 * | 6/2010 | Smoot | G01C 21/165 701/16 |
| 2010/0283832 A1 | 11/2010 | Lin | |

OTHER PUBLICATIONS

Altug, Erdinc, et al., "Control of a Quadrotor Helicopter Using Visual Feedback," *IEEE International Conference on Robotics & Automation*, May 2002 (pp, 72-77).

Yakimenko, O.A., et al., "Unmanned Aircraft Navigation for Shipboard Landing Using Infrared Vision," *IEEE Transactions on Aerospace and Electronic Systems*, vol. 38, No. 4, pp. 1181-1200.

Tanaka, Toshikazu, et al., "Autonomous Flight Control for a Small RC Helicopter~A Measurement System with an EKF and a Fuzzy Control via GA-Based Learning~," *SICE-ICASE International Conference*, Oct. 18-21, 2006, pp. 1279-1284.

Earl, Matthew G., et al., "Real-time Attitude Estimation Techniques Applied to a Four Rotor Helicopter," *43rd IEEE Confernee on Decision and Control*, Dec. 14-17, 2004, pp. 3956-3961.

Benedettelli, Daniele, et al, "Experimental validation of a decentralized Control law for multi-vehicle collective motion," *IEEE/RSJ International Conference on Intelligent Robots and Systems*, Oct. 29-Nov. 2, 2007, pp. 4170-4175.

Won, Dae-Yeon, et al., "Light Source Target Design for Vision-based Blended Wing Body UAV Recovery," *SICE Annual Conference 2008*, Aug. 20-22, 2008, 4 pgs.

* cited by examiner

SYSTEM AND METHOD FOR AUTONOMOUS VEHICLE CONTROL

CROSS-REFERENCE TO RELATED APPLICATIONS

The present application is a continuation of U.S. patent application Ser. No. 13/664,140, filed Oct. 30, 2012, which is a continuation of U.S. application Ser. No. 12/642,605, filed Dec. 18, 2009, now U.S. Pat. No. 8,301,326, issued Oct. 30, 2012, which claims the benefit of U.S. Provisional Application No. 61/203,246, filed Dec. 19, 2008. The present application is also related to U.S. application Ser. No. 13/860,501, filed Apr. 10, 2013 entitled System and Method for Determining an Orientation and Position of an Object. The contents of all of the above referenced applications are hereby incorporated by reference herein in their entireties.

TECHNICAL FIELD

The present disclosure relates to systems and methods for autonomous vehicle control. In particular, the present disclosure relates to systems and methods for automated, feedback-controlled localization of a vehicle to a point in two or three dimensions.

BACKGROUND

An autonomous or automated vehicle may generally be described as any type of vehicle, whether operating underwater, over land, or in the air, that is controlled, in whole or in part, by computerized control systems. Such vehicles typically operate unmanned—that is, without an operator physically present in the vehicle—and are used in a variety of applications where it may be too dangerous, uneconomical, or impractical to employ the conventional, manned vehicle counterpart. As technology advances, autonomous vehicles have found increasing use in civilian and military settings.

Autonomous underwater vehicles (AUVs), also known as unmanned underwater vehicles, may be used to perform a variety of underwater missions such as detecting and mapping submerged wrecks, rocks, and obstructions that pose a hazard to navigation for commercial and recreational vessels. Unmanned ground vehicles (UGVs) may be used in a variety of applications where it is dangerous or impractical for humans to travel, such as over un-surveyed terrain, or through areas of hostile activity in military applications. Unmanned Aerial Vehicles (UAVs) are remotely piloted or self-piloted aircraft that can carry cameras, sensors, communications equipment or other payloads, including military ordinances.

A particular focus of research in autonomous or automated vehicles has been the systems and methods by which they are controlled during their operation. For example, with regard to UAVs, size and weight restrictions can limit the amount of equipment a UAV can carry for performing precision autonomous landings. Rather, current UAV's are designed to be crash resistant—i.e., they are not designed to be able to land at all, but rather to be "usable" subsequent to a crash landing. Despite this, greater than one third of UAV's may be damaged beyond repair during crash landing. At a price exceeding $50,000 per unit, it would be desirable to have a UAV capable of autonomous landing so as to avoid these repair/replacement costs. Other autonomous vehicles (AUVs, UGVs) may also encounter control problems during their operation, which would be benefited by improved autonomous control.

SUMMARY

In one embodiment, a system for localizing an autonomous vehicle to a target area can include a position indicator adapted for association with the vehicle in a three dimensional configuration where the configuration has a relationship to the vehicle orientation. The system can also include a detection device adapted for association with the target area and configured to detect the position indicator. A computation device in communication with the detection device can also be provided and can be configured to compute a position of the vehicle based on the detected position indicator and the relationship of the position indicator configuration to the vehicle orientation. A transmitter can be provided in communication with the computation device and configured to receive information from the computation device and produce a signal carrying the information. A receiver can be adapted for positioning on the vehicle and configured to receive the signal from the transmitter and filter the information therefrom. Additionally, a control system in communication with the receiver can be provided. The control system can be configured for association with and control of one or more directional control components of the vehicle. The control can be based on the information received from the receiver relating to localizing the vehicle to the target area.

In a particular embodiment of the system described, the vehicle can be an unmanned aerial vehicle. In this embodiment, the position indicator can include a plurality of point sources and at least one of the point sources can be positioned on each of two wingtips of the unmanned aerial vehicle. Additionally, at least one can be positioned on an underside or a top side of a vertical stabilizer of the unmanned aerial vehicle.

In a particular embodiment of the system for localizing a vehicle to a point, the position indicator can include a plurality of point sources adapted for arrangement on the vehicle in the three dimensional configuration. The point sources can include sources of electromagnetic radiation. In one embodiment, the sources of electromagnetic radiation comprise LED's. In another embodiment, the sources of electromagnetic radiation are defined by a paint scheme on the vehicle. The detection device can be adapted for capture of electromagnetic radiation from the point sources on a two dimensional plane. In one embodiment, the detection device can be a camera configured to detect visible light.

In one embodiment of the system for localizing a vehicle to a point, the computation device can be a personal computer. In another embodiment, the computation device can include an image capture module configured to control the detection of the detection device. In another embodiment, the computation device can include a position calculating module configured to convert a two dimensional representation of the position indicator to a three dimensional position and orientation of the vehicle.

In another embodiment, a method for localizing an autonomous vehicle to a target area can include capturing a two dimensional representation of a position indicator positioned on the vehicle, computing a position and orientation of the vehicle based on the two dimensional representation and further based on a known configuration of the position indicator and a known relationship between the configuration and vehicle orientation. The method can also include transmitting information to a control system associated with one or more directional control components of the vehicle and manipulating the one or more directional control components using the control system, based on the transmitted information, to localize the vehicle to the target area.

In a particular embodiment of the method described, the capturing step can include receiving electromagnetic radiation projected on a two dimensional plane. The method can also include filtering background noise out of the two dimensional representation. Additionally, the method can include analyzing the two dimensional representation to determine the two dimensional orientation of the position indicator.

In one embodiment of the method, the computing step can include solving linear equations. The linear equations can be bounded by one or more assumptions and in some embodiments can include a Taylor series expansion.

In one embodiment of the method, the vehicle can be an unmanned aerial vehicle and manipulating the one or more directional control components can include manipulating one or more of the ailerons, rudder, elevator, or powerplant of the unmanned aerial vehicle. Manipulating the one or more directional control components can cause the unmanned aerial vehicle to localize toward the target area. Additionally, the target area can be a landing area and the detection device can be located near the target area thereby causing the unmanned aerial vehicle to perform an approach for landing.

BRIEF DESCRIPTION OF THE FIGURES

While the specification concludes with claims particularly pointing out and distinctly claiming the subject matter that is regarded as forming the various embodiments of the present disclosure, it is believed that the embodiments will be better understood from the following description taken in conjunction with the accompanying Figures.

DETAILED DESCRIPTION

Figure 1:
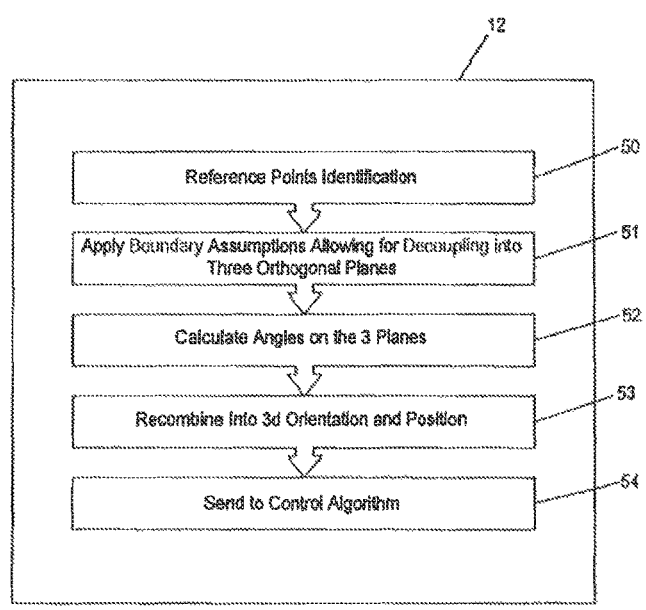
FIG. 1 is an exemplary diagram depicting a method for vehicle control.

The present disclosure relates to a system and method for autonomous vehicle control. Specifically, the present disclosure relates to systems and methods for automated, feedback-controlled localization of a vehicle to a point in two or three dimensions. For example, referring to FIG. 1, a vehicle can be located at a first coordinate A ($x_1$, $y_1$, $z_1$) in three dimensional space. The system in accordance with the present disclosure can be used to localize the vehicle along the arrow C to a second coordinate B ($x_2$, $y_2$, $z_2$).

An autonomous vehicle capable of use with the systems and methods of the present disclosure may include, but is not limited to, an autonomous underwater vehicle, an unmanned ground vehicle, or an unmanned aerial vehicle. It is to be noted that autonomous control can be provided with or without the presence of an onboard operator or remote operator. As such, the disclosed system is not limited to unmanned vehicles or those without remote control capabilities.

Figure 2:
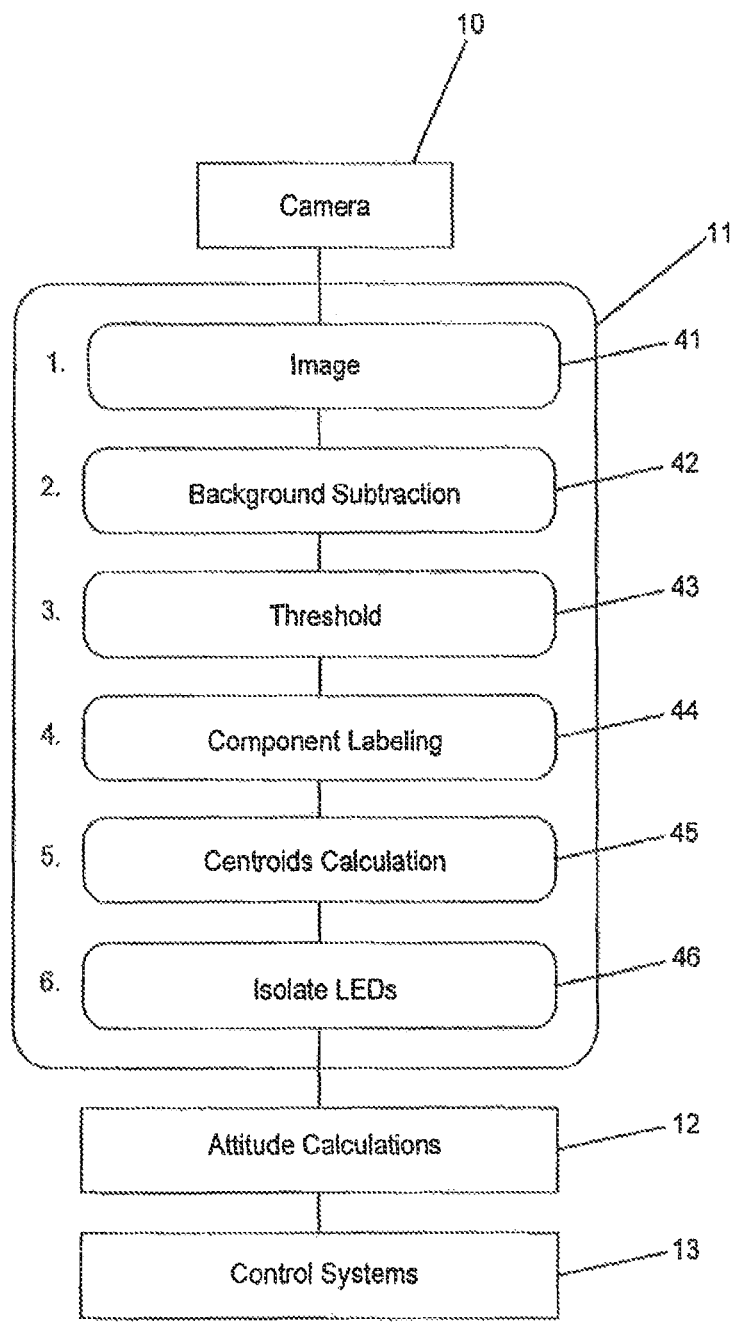
FIG. 2 is a perspective diagram of a system for vehicle control according to certain embodiments.

Referring to FIG. 2, the use of the system with an unmanned aerial vehicle (UAV) is shown. An environment 110 is depicted including a vehicle 100 in a flying configuration at an altitude above the ground 113 equal to the distance C. The system of the present disclosure may cause the vehicle 100 to localize approximately along the path A (and approximately along the over-ground projection B) to a target area D located, for example, on the ground 113, or at any other position, such as on a tripod, on a capture net, on a moving vehicle, on top of a building, aerial refueling craft, docking space, etc. Thus, in localizing to the target area D, the UAV together with the system herein described may be capable of performing an autonomous, feedback controlled approach to landing.

Referring still to FIG. 2, the system may generally include two sub-systems: a first sub-system 120 located on and integrated within the vehicle 100, and a second subsystem 140 independent of the vehicle 100 and located at a fixed position relative to the vehicle 100, for example at or near position D. The first sub-system 120 may comprise components which receive information, process that information, and control the direction of the vehicle 100 in two or more dimensions. Such components may be referred to as an "autopilot." The first sub-system 120 may also comprise components which allow the vehicle's position to be detected. The second sub-system 140, which may be located at or near target area D, may comprise components for detecting the position of the vehicle 100, which may work in cooperation with the components of the first sub-system 120 which allow the vehicle's position to be detected. The second subsystem 140 may also comprise components that process the vehicles position and transmission components that allow the second sub-system 140 to transmit information to the directional control components of the first sub-system 120. Thus, the autonomous feedback controlled localization may function generally in the following manner. The components of the second sub-system 140 may detect the position of the vehicle 100. The position may be processed to determine the vehicle's current position relative to the target area and the second sub-system 140 may transmit positional or control information to the first sub-system 120 located on the vehicle 100. The first sub-system 120 may then receive the transmitted information, process the information as required, and control the vehicle 100 so as to localize to the target area D.

Figure 3:
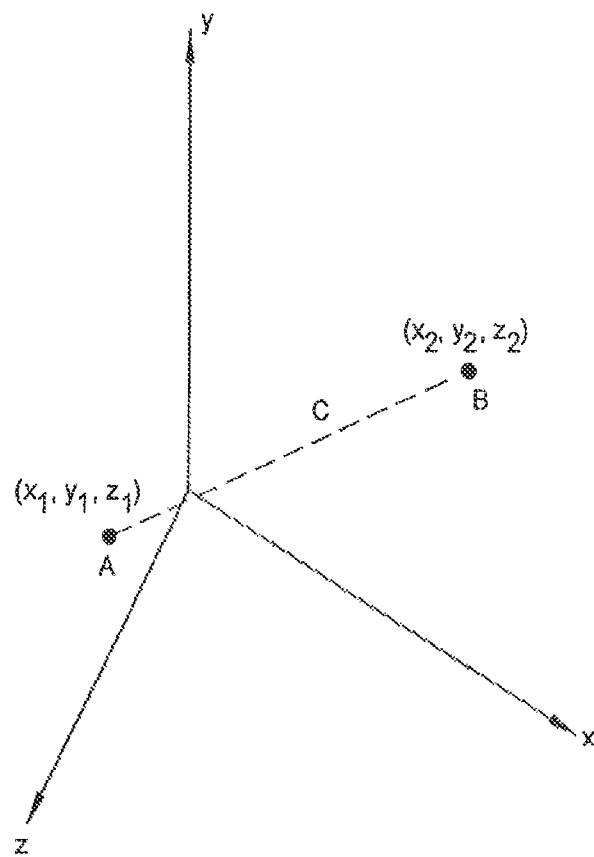
FIG. 3 is a close-up diagram of a first sub-system of the system of FIG. 2 on the vehicle of FIG. 2.

Referring now to FIG. 3, particular attention can be drawn to the components of the first sub-system 120. The first sub-system 120 can include a receiver 122, an inertial measurement unit (IMU), a computation device 124, a control system 126, and a position indicator 128. In some embodiments, the computation device 124 may or may not be provided. For example, depending on the nature of the system, the first sub-system 120 may be adapted to develop control information based on a position provided by the second sub-system 140. In this system, a computation device 124 may be provided to develop this control information. In other embodiments, this control information may be developed by the second sub-system 140 and the computation device 124 can be omitted. Additionally, the IMU 123 may be operatively coupled to the computation device 124. The IMU may include, but is not limited to, any of the following components alone or in combination: gryos, accelerometers, magnetometers, global positioning system (GPS), barometer, thermometer, thermocouple, or alpha beta sensor, etc.

The receiver 122 can be positioned on the vehicle 100 and can be configured to receive a signal from the second sub-system 140. The signal may carry control instructions or positional information developed or obtained, respectively, by the second sub-system 140 and transmitted thereby. The receiver 122 can thus be configured to filter the control instructions or the positional information from the signal. In the case of control instructions, the receiver 122 can further be configured to communicate the instructions to the control system 126. In the case of positional information, the receiver can further be configured to communicate the instructions to the computation device 124. The receiver may be any known receiver capable of receiving a signal, filtering the signal, and communicating the information carried by the signal to another device. In one embodiment, the receiver 122 a radio receiver adapted to receive radio wave transmissions with digital or analog information relating to a vehicle's position or control. The computation device 124 may receive additional measurement information from the IMU 123.

The control system 126 can also be positioned on the vehicle 100 and can be operably connected to the directional controls of the vehicle 100. The directional controls to which the control system 126 is connected depend on the type of vehicle 100 being employed. The control system 126 may be configured to control the vehicle's motion in one or more dimensions. For example, in the case of an autonomous underwater vehicle, the control system 126 may be operably connected to the fins, rudder, and propulsion system in order to control the vehicle's depth, lateral position, and forward position in the water. In the case of an unmanned ground vehicle, the control system 126 may be connected to the accelerator/decelerator and steering mechanism to control the vehicle's forward position and lateral position over the ground. Furthermore, in the case of an unmanned aerial vehicle, the control system 126 may be connected to the engine and the flight control surfaces, in order to control the vehicle's altitude, and lateral and forward positions. A control system 126 may be connected to other types of vehicles in like manners to control such vehicles' motion in one or more dimensions.

In one embodiment, as shown in FIG. 3, the control system 126 may be connected to the directional control components of a UAV. Such directional control components may include, the elevator 102, rudder 104, ailerons 106, and powerplant 108 (e.g., reciprocating piston, turbofan, etc.). The control system 126 may preferably be configured to fully control all aspects of the UAV's directional movement, including controlling full range of motion of the elevator 102, rudder 104, and ailerons 106, and full throttling of the powerplant 108 from idle to full throttle. The individual mechanized components of such a control system 126 will be known to and appreciated by those skilled in the art, and may include, for example, actuator/cable assemblies, servos, hydraulics and air/fuel mixture regulators, among others.

The first sub-system 120 may further include a computation device 124 to compute control instructions for the control system 126 to use to control the movement of the directional control components of the UAV to cause the UAV to fly in a desired manner. For example, such a computation device 124 may provide control instructions to the control system 126 to cause the UAV to fly from a first, known position to a second, desired position through appropriate manipulation of the directional control components. Thus, if the computation device 124 receives known positional information of the UAV which is, for purposes of illustration, below and to the left of (relative to the direction of flight) a desired position, the computation device 124 may develop instructions such that the control system 126 causes the elevator 102 to deflect upwardly (thereby causing the UAV to gain altitude), the powerplant 108 to increase output (thereby causing the UAV to maintain adequate airspeed during a climb), the left aileron 106 to deflect downwardly and the right aileron 106 to deflect upwardly (thereby causing the UAV to bank to the right), and the rudder 104 to deflect to the right (thereby counteracting adverse yaw caused by the banking and possibly the induced p-factor in the case of a propeller driven UAV). Such positional information may be augmented/validated by the measurements made by the IMU 123 and sent to the computation device 124. The magnitude of such positional control inputs by the control system 126 may be determined by the relative distance between the known position and the desired position, among other factors. Further positional information received by the computation device 124 may cause further changes to the directional control components, again based on the UAV's known position relative to a desired position.

With continued reference to FIG. 3, the first sub-system may further include one or more position indicators 128 located on the vehicle 100. A position indicator 128 may include an element, detail, surface scheme or other indicating feature adapted to mark a point on the vehicle 100. Any number of position indicators can be provided. Preferably three or more are provided. In the shown, the position indicators 128 are in the form of three discreet point sources of electromagnetic radiation located at three points on the vehicle 100. The electromagnetic radiation emitted by these indicators 128 may include, but is not limited to, radio waves, microwaves, terahertz radiation, infrared radiation, visible light, ultraviolet radiation, X-rays and gamma rays. Point sources of electromagnetic radiation may be generated on the vehicle in any known manner. For example, LED lights may emit point sources of visible light of any color. In some embodiments, a point source may be a reflection of electromagnetic radiation. For example, reflectors or reflective tape may be positioned on the exterior of the vehicle 100 causing sunlight to be reflected at those points. Or more simply, the point sources may be known, discreet positions along the exterior of the vehicle which reflect sunlight and thereby provide a point source of electromagnetic radiation of visible light in the color of that point on the exterior of the vehicle 100. In one embodiment, a particular paint pattern can be used to define the point sources. In still another embodiment, reflective paint may be used such as paint with metal flecks or other reflective materials included in the paint. The vehicle 100 shown in FIG. 3 includes three position indicators 128 in the form of three point sources of electromagnetic radiation disposed about the exterior of the vehicle, although it will be appreciated that greater than three point sources may also be used.

In one embodiment of the presently disclosed system, the position indicator 128 can be in the form of an LED-type point sources of a particular wavelength. The point sources can be provided at any position on the exterior of the vehicle 100. In one embodiment, the point sources can be provided at the greatest possible distances separated from the center of gravity (CG) of the vehicle 100. For example, as shown in FIG. 3, point sources may be provided on each wingtip, and on the top or bottom side of the vertical stabilizer of the UAV. Alternatively, point sources may be provided on each wingtip, and on the front of the UAV's nose, so as to avoid occlusion of the light source, which may occur depending on the configuration and orientation of the UAV. LED's or other power requiring point sources may be connected to the internal battery or other power source of the vehicle 100. Alternatively, each point source may have its own power source, e.g., battery.

Figure 4:
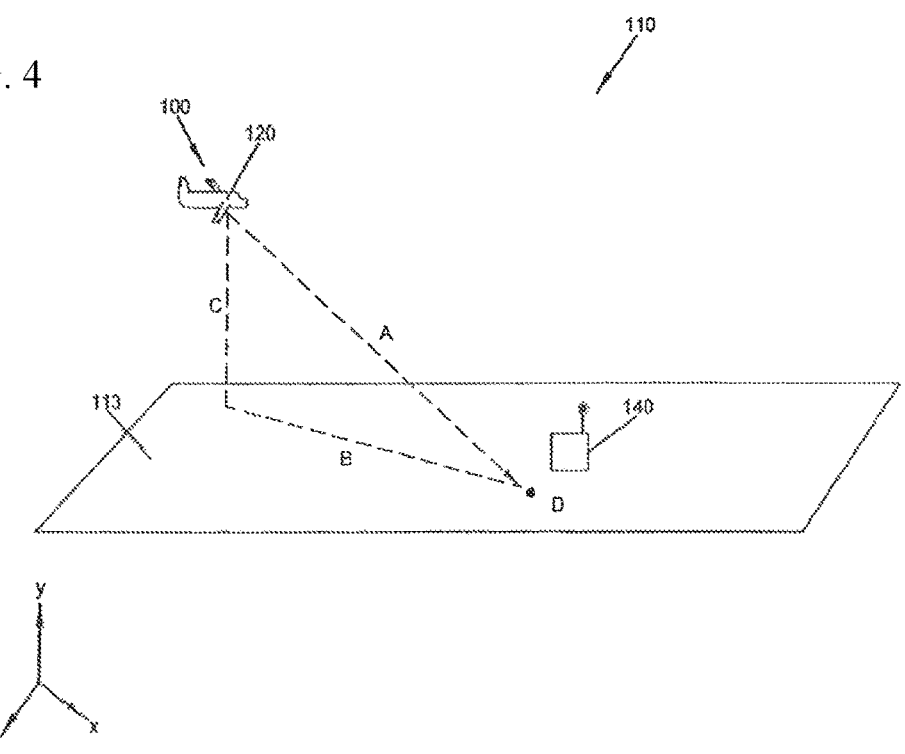
FIG. 4 is a schematic diagram of a second sub-system of the system of FIG. 2.

Referring now to FIG. 4, general reference will now be made to the previously mentioned second sub-system 140 of the system of the present disclosure. The second sub-system 140 may include a detection device 142, a computational device 144, and a transmitter 146. The detection device 142 may be adapted to detect the position and orientation of a vehicle 100, while the computational device 144 may be adapted to interpret the information from the detection device 142 and determine the orientation and position as well as develop control instructions. The positional information and/or the control instructions can then be transmitted via the transmitter 146 to the first sub-system 120.

In one embodiment, the detection device 142 can be adapted to detect the position indicators 128 of the first sub-system. In a particular embodiment, the detection device 142 can be an electromagnetic radiation detection device. In this embodiment, the detection device 142 can be configured to detect the position of three or more point sources of electromagnetic radiation in two dimensions. The device 142 may be configured to provide a two dimensional display of the detected position indicators 128. The two dimensional display may thereby show the detected two-dimensional positions of the detected position indicators 128 relative to one another. In one embodiment, the detection device 142 may be a camera configured to detect visible light of a particular wavelength. For example, the camera may be adapted to detect the particular wavelength or range of wavelengths generated by the particular position indicators 128 provided on the vehicle. More particularly, the camera may be adapted to detect the wavelength generated by LEDs. Alternatively, the camera may be adapted with software or firmware to only detect a particular frequency of flashing light, wherein the light sources may utilize frequency modulation to provide the desired frequency. For example, a camera with a fixed and steady frame rate may be employed of dected light source flashing at a frequency of 1/8, 1/3, 1/4, 1/2, etc, the frame rate of the camera.

Figure 5:
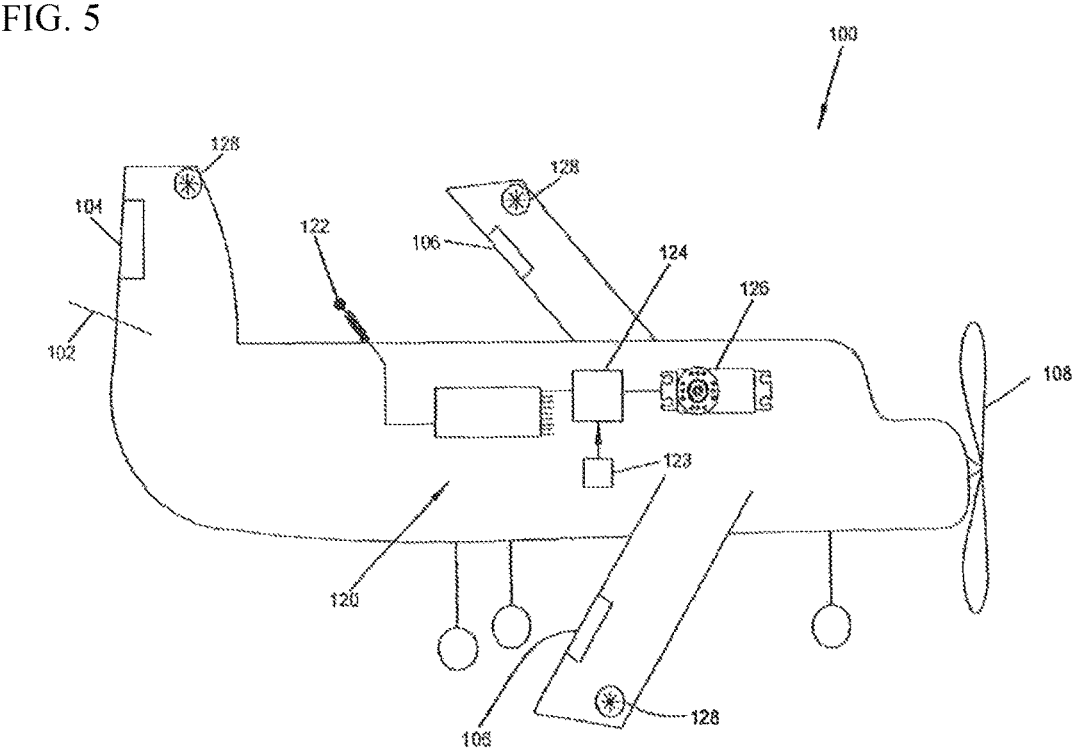
FIG. 5 is side view diagram of the system of FIG. 2 showing the interaction of the first and second sub-systems.

Referring to FIG. 5, a detection device 142 is depicted as detecting the electromagnetic radiation from the position indicators 128 located on the exterior of the vehicle 100. As shown therein, the vehicle 100 may generally be localizing toward the detection device 142 in the direction A, and in this configuration, the position indicators 128 may generally be detectable (i.e., not obstructed by other parts of the vehicle) by the detection device 142.

Figure 6:
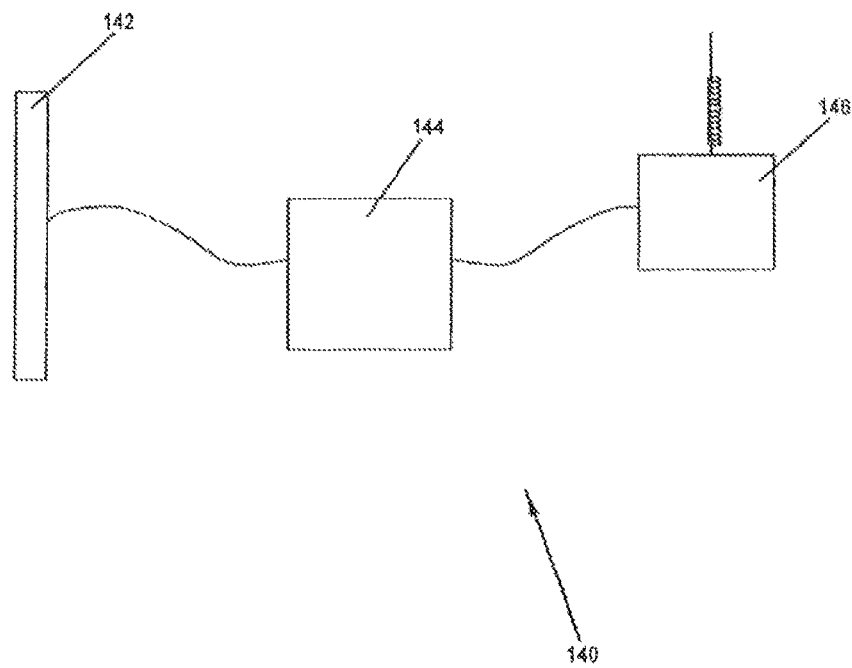
FIG. 6 depicts a display of a detection system of the system of FIG. 2.
Figure 7:
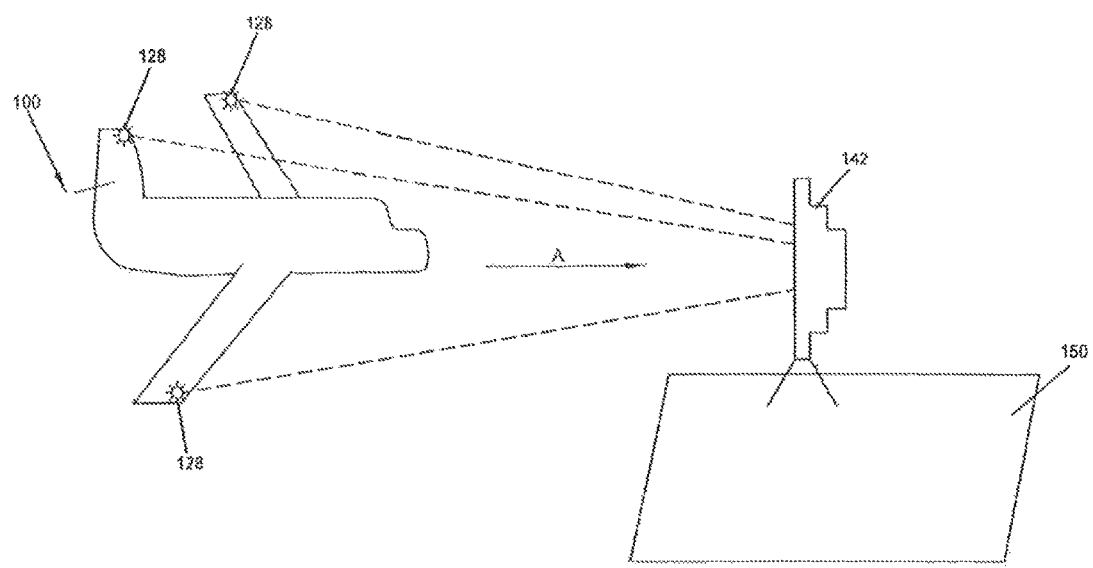
FIG. 7 depicts a display of a detection system of the system of FIG. 2.

Referring to FIG. 6, a two dimensional display 148 of the detection device is shown. The image shown on the display 148 is what may appear from the configuration depicted in FIG. 5. Specifically, position indicators 128 are depicted on the two-dimensional display 148 as the detection device 142 detects their position in two dimensions. FIG. 6 depicts a ghost image of the vehicle 100 in relation to the detected position indicators 128. Referring to FIG. 7, the two dimensional display 148 has been filtered to show only the position indicators 128 and not the ghost image.

Referring again to FIG. 5, in one embodiment as adapted for use with a UAV, the detection device 142 may be located at any position, for example, on a tripod, on a capture net, on a moving vehicle, on top of a building, aerial refueling craft, docking space, etc., and at any distance from the flight path (arrow A) of the UAV. Preferably, the detection device 142 may be located on the ground near a landing area 150 where the UAV is desired to be landed. The detection device may display the detected location of the radiation in two dimensions. Preferably, the first dimension is the azimuth of the source relative to the horizon, and the second dimension is the altitude of the source relative to the horizon.

Referring again to FIG. 4, the second sub-system 140 may further include a computer 144, or other computation device capable of performing mathematical calculations. The computer 144 may be operably connected to the detection device 142, and may be configured to receive the two-dimensional display/data of the positional indicators 128 generated by the detection device 142. In particular, a computer 144 in accordance with the present disclosure may have encoded instructions thereon configured to calculate the two or three dimensional position of the positional indicators 128 relative to the detection device 142, based on the two dimensional display 148 generated by the detection device 142 and further based on the known configuration of the position indicators 128 on the vehicle 100. For example, in the case where the position indicators 128 are three point sources on the exterior of an autonomous vehicle, the computer 144 may have information stored thereon related to the position of the point sources on the exterior of the vehicle, and may use that information to calculate the vehicle's two or three dimensional position relative to the detection device 142 based on the two-dimensional display 148 of the three point sources generated by the detection device 142. Such calculation may be accomplished by any known mathematical method, or approximation thereof.

The second sub-system 140 may further include a transmitter 146 operably connected to the computer 144. The transmitter 146 may be configured to transmit control instructions or position information related to the control or position of the vehicle 100. The control instructions or position information to be transmitted may be based on the computed two or three dimensional position of the vehicle 100, as computed from the two-dimensional display 148 of the position indicators 128. In particular, control information may be transmitted based on the vehicle's current position in relation to a desired position. The transmitter 146 may transmit in a manner, for example radio waves, such that the transmission is receivable by the receiver 122 of the first sub-system 120, located on the vehicle 100.

In one embodiment of the presently disclosed system for use with UAVs, as depicted in FIG. 7, a computer 144 may be operably connected to detection device 142 to mathematically transform the two dimensional positional information of a UAV into three dimensional positional information (the third dimension being the distance of the UAV from the detection device, or range), using the known positioning of the position indicators 128 on the UAV. This calculation may be performed using mathematical formulae. Preferably, the calculation is carried out using linear approximations.

A transmitter 146 operably connected to the computer 144 may be configured to transmit positional information (arrow B) so as to be receivable by the receiver 122 (shown in FIG. 3) of the first sub-system 120 on the UAV, as previously discussed. Alternatively, the transmitter 144 may be configured to transmit control information to the receiver 122. Where control information is to be transmitted, the computer 144 may use the calculated position of the UAV as compared to the desired position of the UAV to transmit control information to the UAV to cause the UAV to fly toward the desired position (along arrow A), as also discussed above. The instructions here can be the same or similar to those instructions provided by the computation device 124 described with respect to the first sub-system 120 for the condition where the first sub-system received only positional information from the second sub-system 140.

As previously mentioned, the present disclosure relates to systems and methods for automated, feedback-controlled localization of a vehicle to a point in two or three dimensions. A method in accordance with the present disclosure may include detecting the position indicators 128, displaying the position indicators 128 on a two-dimensional display, calculating the two or three dimensional position of the vehicle 100 based on the detected position indicators and on the known configuration of the indicators 128 on the vehicle, developing control information, transmitting positional or control information to the vehicle based on its calculated position relative to a desired position, receiving the positional or control information, developing control information as required, and adjusting the vehicle controls to cause the vehicle to localize to a point, based on the positional or control information received.

Figure 8:
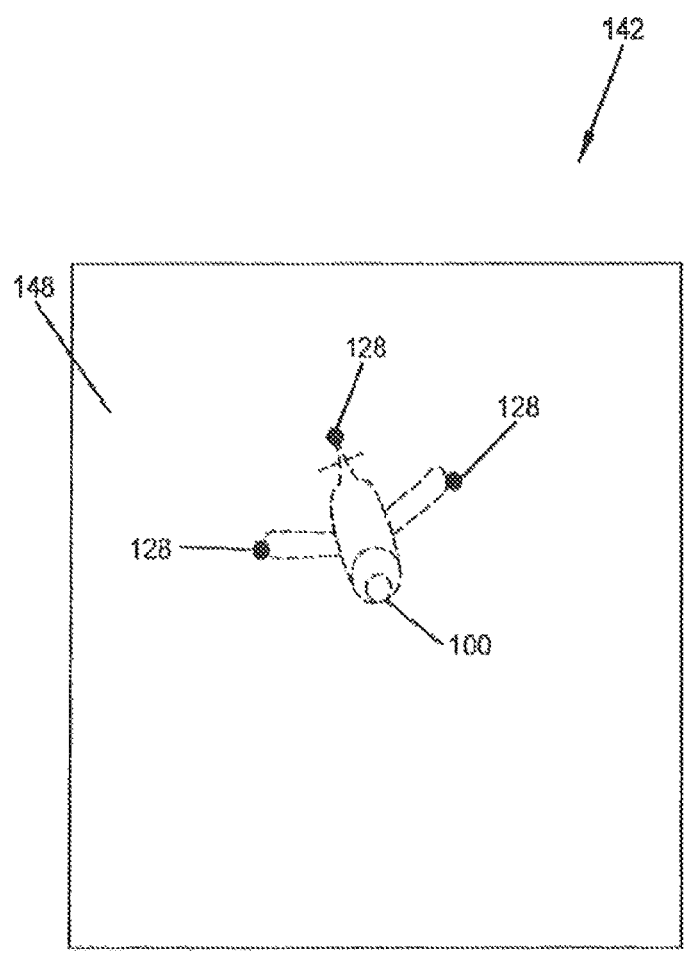
FIG. 8 is a detailed view of the system of FIG. 2.

Accordingly, embodiments of the presently described method may be adapted for use with a UAV to cause the UAV to localize to a desired position in three-dimensional space, for example, an autonomous feedback controlled approach to landing. As depicted in FIG. 8, such a method may include, for example, detecting the position indicators 128 (reference numeral 10), displaying in two dimensions the detected positions of the point sources of the UAV on a display (reference numeral 11), computing the three-dimensional position of the UAV based on the detected two dimensional position of the point source and further based on the location of the point sources on the exterior of the UAV (reference numeral 12), developing control instructions (reference numeral 13), transmitting position or control information to the UAV (reference numeral 14), and manipulating the directional control components of the UAV to cause the UAV to fly to a desired position (reference numeral 15). As noted by the circular nature of the FIG., this process can occur in a looped fashion to repeatedly capture the position of the UAV and repeatedly control its path of flight.

With specific attention to the procedures of the method outlined above, detecting the position indicators 128 may include capturing a visual image of the vehicle 100 including the position indicators 128. The device may provide a two dimensional display 148 of the detected position of the sources of electromagnetic radiation relative to one another. Providing this display may include portraying the positions on a viewable screen or it may include merely creating an electronic record of the positions of the position indicators 128 in a two dimensional plane.

Based on these relative positions of the point sources on the two dimensional display, the two or three dimensional position of the vehicle 100 relative to the detection device 142 may be calculated. The calculation may include the known position of the position indicators 128 on the vehicle 100. A computer, or other computation device, 144 connected to the detection device 142 may compute using the two dimensional information generated from the device 142 with the position indicator 128 position information to provide a two or three dimensional position of the vehicle 100 relative to the detection device 142. The computation may be done by any mathematical technique. Such mathematical techniques may include, for example, a series of two or three linear approximations, for example, Taylor series expansions.

Depending on the nature of the system, the computer 144 may also calculate control instructions. That is, where the system is set up to provide control instructions to the first sub-system 120 in lieu of merely positional information, the computer 144 can further calculate control instructions. This calculation can include a comparison of the position of the vehicle 100 as compared to the desired position and can further include developing vehicle commands for adjusting the trajectory of the vehicle 100.

Based on the calculated position of the vehicle 100 relative to the detection device 142, a transmitter connected to the computer or computation device 144 may transmit position or control information to the vehicle 100. This transmission can occur via radio transmission or other transmission capable of carrying the position or control information. A receiver 122 on the vehicle 100 may be configured to receive such position or control information. The receiver 122 may be operably connected to a control system 126 on the vehicle 100, the control system 126 being capable of controlling all of the directional control components of the vehicle 100. The vehicle 100 may use this positional or control information to localize to a desired point or location. In one embodiment, the vehicle 100 may localize to the position of the detection device 142.

In the case of positional information being transmitted to the vehicle 100, the computation device 124 may determine whether the vehicle 100 is localizing to the desired point based on the vehicle's change in position over time. If the computation device 124 determines that the vehicle is proceeding on a path to the desired point, then the system may not implement any directional control changes. If, alternatively, the computation device 124 determines that the vehicle 100 is deviating from the localizing course, appropriate directional control changes may be input to the vehicle's directional control components to cause the vehicle 100 to localize to the desired point or position.

As mentioned above, in the case of control information being transmitted to the vehicle control system, the computer or computation device 144 of the second subsystem 120 may first determine whether the vehicle 100 is properly localizing to the desired point based on its calculated changes in position over time, and then directly transmit directional control information to the vehicle 100, if needed. Upon receiving such control information, the control system 126 on the vehicle 100 may cause directional control changes to be input to the directional control components of the vehicle 100.

Referring to FIG. 8, in one embodiment of the method of the present disclosure suitable for use with a UAV, the detection device 142 may be positioned at or near a desired landing area 150 for the UAV. The computed position of the UAV, based on the detected position of the points sources of electromagnetic radiation and the known configuration of the point sources on the exterior of the UAV, may be used to localize the UAV (along line A) to the position of the detection device 142, thereby causing the UAV to localize to the landing area 150 as an approach for landing. Position or control information may be transmitted (via transmitter 146) from the detection device 142/computer 144 to cause the control system 126 on the UAV to manipulate the directional controls of the UAV to maintain a desired approach course (including horizontal (azimuthal) position, glideslope (altitude), and airspeed) to the landing area 150.

Certain components of the system and method of the present disclosure will now be described in greater detail with regard to preferred embodiments adapted for use with a UAV. As will be appreciated by those of skill in the art, other components may be used interchangeably without departing from the spirit and scope of the disclosure, as set forth in the appended claims—thus, the following example embodiments are not in any way intended to be limiting.

Figure 11:
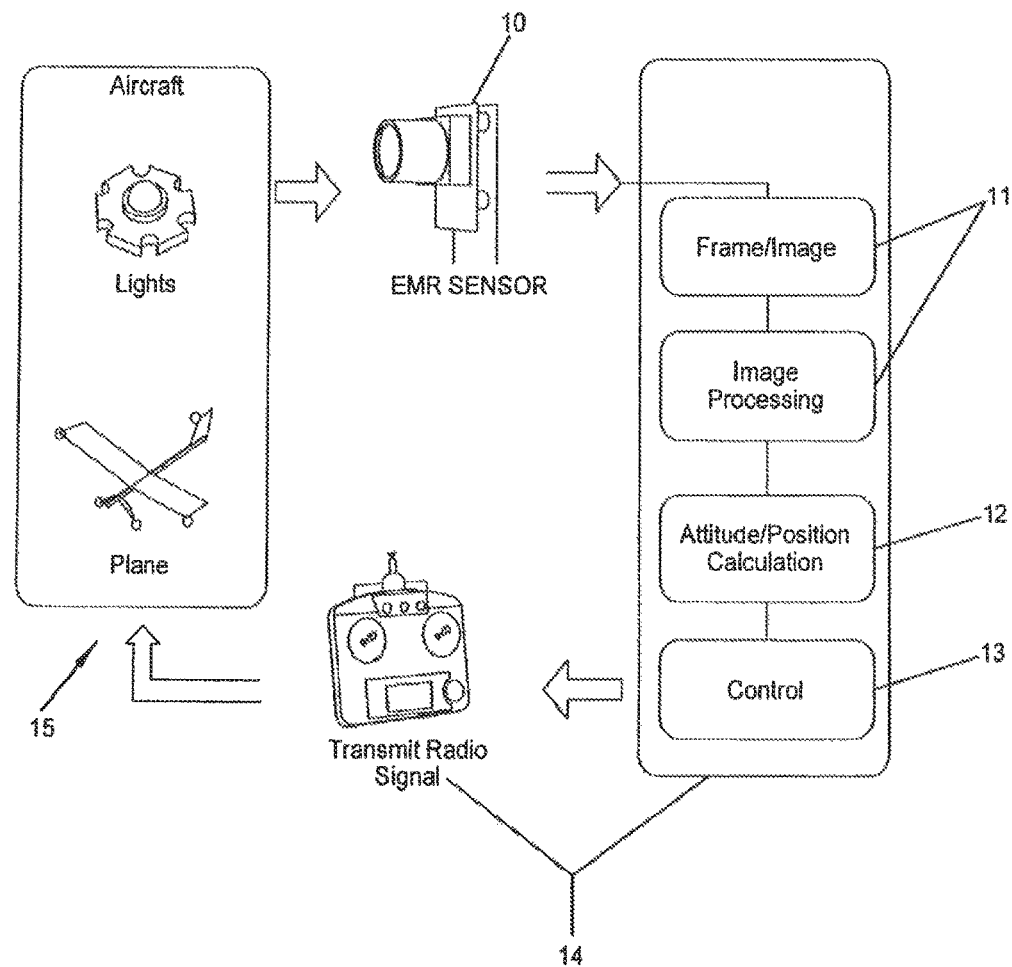
FIG. 11 is a graph of the relative intensity of certain sources of electromagnetic radiation.

In one embodiment, position indicators 128 may include point sources in the form of LEDs. LEDs are desirable because they are lightweight, durable, have a high output to power ratio, have a wide viewing angle, and are distinguishable against background noise for purposes of detection. FIGS. 10a-d depict the detected electromagnetic radiation from LEDs positioned on a UAV at a distance of approximately 500 feet, wherein the UAV is oriented, respectively, at 60, 45, 30, and 0 degrees relative to a detection device configured to detect LED light. The left LED in each Figure has a power of 1 Watt, while the right LED in each Figure has a power of 3 Watts, although any Wattage of LED may be used. Desirable wavelengths of electromagnetic radiation (LED light) may be in the approximately 635-808 nanometer range, which is largely distinguishable against sunlight, blue skies, and red sunsets. FIG. 11 shows a graph of relative intensities of background visible light caused by the sky and the sun, which may be used in selecting an appropriate wavelength of LED for use with the teachings of the present disclosure. Other suitable sources of electromagnetic radiation in the visible spectrum may include, but are not limited to, incandescent, fluorescent, arc lamp, and gas discharge lighting.

With regard to the detection device 142, some embodiments in accordance with the present disclosure may employ a camera sensor. Desirable characteristics of a detection device 142 may include, but are not limited to, frame rate, resolution, and range of wavelength detection capabilities. For example, the Micron® MTV9032 camera sensor has been found to be desirable for use in detecting LED light in the approximately 635-808 nanometer range, as discussed above, or more broadly in the approximately 375-900 nanometer range. This particular model has the benefits of a high frame rate (60 frames per second) and a high resolution (2.4 megapixel) to more accurately determine and display the position of the point sources of electromagnetic radiation for subsequent positional calculations. Other camera types and styles can be used. The device may further be configured with a variety of lenses. Appropriate lens selection may be determined by the environment in which the system is being used. For example, some applications may require a long focal length (for example, where detecting the UAV at long distance is desirable); alternatively, some applications may require a wide viewing window or horizon length (for example, where detecting the UAV across a broad range along the horizon is desirable). To determine field of view and focal length, the following equations may be used. With respect to the field of view:

$$\theta_{FOV} = 2 \arctan \frac{DesiredHorizonLength}{2D}$$

Wherein D is the distance to the UAV. With respect to the focal length:

$$FocalLength = \frac{C}{\tan(\theta_{FOV})}$$

Wherein C is the aperture number of the electromagnetic radiation detection device, which in some embodiments may be a camera. In embodiments where the UAV is desired to be viewable at 500 feet, an approximately 22 degree window and 60 meter horizon length may be used, which equates according to the above equations to an approximately 12-13 millimeter focal length and 8 as the aperture number.

Furthermore, the detection device 142 may be outfitted with an appropriate light (optical) filter, for example, a band pass filter, to further enable the device to more accurately detect the position of the LEDs, and reduce the background "noise" which may be particularly prevalent on sunny days. Such an optical filter may be a narrow band pass filter which allows the specific frequency of LED light to pass through while attenuating others. In one embodiment employing 635 nm LEDs, a band pass filter with a 10 nm pass may be used. Preferably, a band pass filter will not attenuate the pass band at all—however, if a sharp attenuation of wavelengths outside the band is desired, a band pass filter which attenuates the pass band up to 60% or more may be used. In alternative embodiments, electromagnetic radiation outside the visible spectrum may be employed to avoid visible light background noise.

Figure 12B:
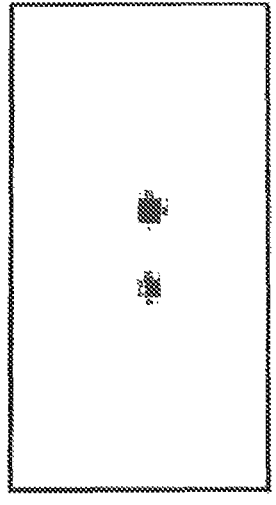
FIG. 12b is another exemplary second sub-system for use with the system of FIG. 2.
Figure 12D:
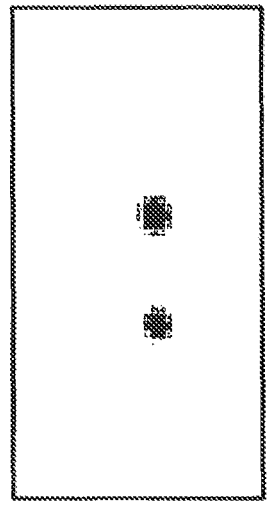
FIG. 12a is an exemplary second sub-system for use with the system of FIG. 2.
FIG. 12c depicts modules of the system according to an embodiment.
Figure 12A:
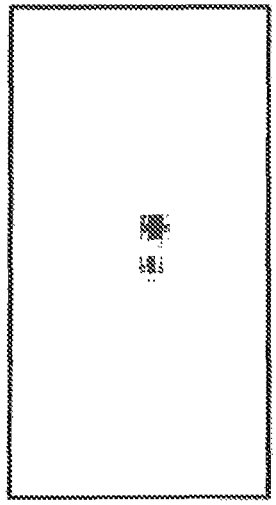

With regard to the computer or computation device 144, as depicted in FIG. 12a, the computation device 144 may comprise a processing board 31 having included thereon an electromagnetic radiation detector (sensor) port 24 for receiving information from the electromagnetic radiation detector 22 through cable 23, a signal converter 25 for converting the two dimensional display from the detector into an electronic signal, RAM 26, a processor 27 for performing the position and/or control calculations, a signal converter 28 for converting the positional or control information into a transmittable signal, memory 29, a radio controller transmitter port 30 for communicating positional/control information, via cable 32, to the radio controller 33 and transmitter antenna 34. In some embodiments, the memory 29 can be in the form of program memory. Desirable qualities of a computation system may include a high frequency processing rate and large memory capacity, due to the large amount of data being sent from the detection device.

In particular, the Analog Devices® Blackfin Dual DSP chip (BF561) has been determined to be a suitable computation device for use with the presently disclosed systems and methods. In particular, this device achieves a high computation rate, which aides the speed with which positional or control information may be transmitted to the UAV after detecting the position indicators 128. Programming of the computation device may be done in any computer language, with VisualDSP++ 4.5 being a preferred language.

Using this particular example computation device, the image may be captured by the detection device 142 and transferred to the processing board 31 using a parallel data bus running at 27 MHz. The BF561 may read in the frame data through its Parallel Port Interface (PPI), PPI0. The frame data may be transferred via Direct Memory Access (DMA) to Level 3 (L3) SDRAM, which has 64 MB divided into four banks. Core A of the BF561 may handle the PPI0 interrupt routine, which simply signals that a frame has been successfully captured. Core A may also handle in its main function, which consists of an infinite loop, the buffering scheme to place input frames into one of two frame buffers.

Using frame buffers in separate memory banks may benefit the processing speed because of the nature of the DMA channels and SDRAM memory access. SDRAM memory access may experience increased latencies if simultaneous DMA transfers are initiated on the same bank. Further, if DMA transfers are initialized on the DMA channels, latencies may increase. In one embodiment, a set of frame buffers for the camera input frames in two separate banks may be employed. Thus, the system may switch back and forth between two input buffers; while one frame is being processed, the next frame may be loaded via the PPI0DMA channels.

Core A may also perform background subtraction, thresholding, and blobfinding (i.e., locating possible LED "blobs" in the image), as will be discussed in greater detail below. Because of latencies involved in multiple accesses to the same SDRAM bank, data may be transferred from SDRAM to L1 cache via DMA channels in order to process image data faster. The processor can access L1 cache at the system clock speed; therefore, even though it takes some time to transfer data via DMA, performing the processing on L1 cache may be significantly faster. One line (752 pixels) of data may be transferred at a time into L1 cache, using two L1 data buffers when transferring lines via DMA; while one line is being processed, the DMA transfers the next line. The purpose of the buffer, like the input buffers for the entire image frame through the PPI, may be to minimize the wait time by utilizing hardware memory transfers (i.e., DMA) that do not lock up the processor. On each pixel, background subtraction may be performed with a reference frame pixel. The reference frame is updated periodically every few seconds. After background subtraction, a threshold is used to determine which pixels are examined further in the blob-finding routine. The threshold may adjust manually, by noting at what distances we can distinguish LEDs without bleeding from intensities that are too bright in combination with changing the aperture size (thus allowing more or less light into the camera sensor). Alternatively, the threshold may be set automatically to adjust for the aperture size and the threshold used.

In an alternate configuration of a computer or computation device, as depicted in FIG. 12*b*, the computation device 144 may comprise a PC 39 having connected thereto the electromagnetic radiation detector (sensor) 22 through cable 23. The previously described calculations may be performed using software stored on or accessible by the PC 39. Such software may comprise an application programming interface (API) which may be exportable to any other PC. Control components, such as radio controller 33 may also comprise an independent API. The PC 39 may output information through a cable 35 to a signal converter box 36 for converting the information to a form transmittable by the radio controller 33 and the transmitter antenna 34. Similar data processing techniques, as discussed above, may also be used in this configuration.

Figure 12C:
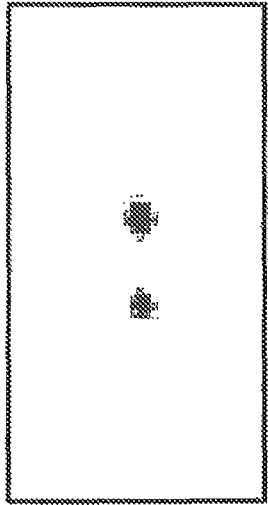

In the embodiment of FIG. 12*a* or 12*b*, the computation device 144 may include one or more modules for carrying out the method described with respect to FIG. 9 and more particularly with respect to FIGS. 13 and 14 below. Accordingly, as shown in FIG. 12*c*, the computation device 144 can include an image capture module 160, an image analyzing module 162, a position calculating module 164, and a control development module 166. Each of these modules or components thereof, can include software or a portion thereof, hardware or a portion thereof, or a combination of software and hardware adapted to perform the associated method. It is also noted that each module or component thereof can be combined or overlapped with or combined with modules or components performing other tasks in the process. In some embodiments, this overlap or combination may include tasks or steps adjacent to one another in a process, but in other embodiments, the tasks and steps may not be adjacent one another. Moreover, any module or component thereof may or may not be included in the system depending on the nature of the system desired. Additionally, the computation device 144 or any module or component thereof can each include an input and output module adapted to receive or send information from or to, respectively, other devices, modules, or components. As such, these input and output modules can include physical ports or connection to a bus where the input or output module is of the hardware type. Other types of input and output hardware can be used. In the case of software based input and output modules, these can include lines of code causing a processor to step or jump from one location to another or an application programming interface, for example. Other types of software based input and output can also be used.

The modules and components thereof can be located within the computation device 144 in one or more of the locations shown in FIGS. 12*a* and 12*b* for a given configuration. For example, in the case of a module where all or a portion of it is software, the software can be located, for example, in the memory 29, for being accessed by the processor 27. In other embodiments, the processor 27 can include the software. In the case of a module where all or a portion of the module is hardware, for example, the hardware may be a circuit board in communication with the computation device 144 for access by the processor 27. Those of skill in the art will understand and appreciate the several configurations available for using software, hardware, or a combination thereof to provide a module.

With regard to the image capture module 160, this module can be adapted to control the detection device 142 such that images of the vehicle can be captured. For example, this module can include a shutter control and other controls associated with activating the detection device 142 to capture an image. The capture module can include an initial detection component that continuously or intermittently activates the detection device to determine whether a vehicle has come into view of the detection device. Upon recognition of a vehicle, the initial detection component may activate the detection device. In the active mode, the detection device may capture images at a certain frequency. To this end, the image capture module may include a timing component that compares an elapsed time since the previous image capture process to a desired period and actuates the detection device when the elapsed time reaches the desired period. In addition, the image capture module can include a shut down component that deactivates the detection device when a vehicle is no longer in range.

With regard to the image analyzing module 162, this module can be adapted to apply filtering techniques to an image or electronic record thereof. As such, the image filtering module can perform the image processing portion of step 11 as shown in FIG. 9. More particularly, for example, with regard to FIG. 13, the image filtering module 162 may include a background subtraction component adapted to adjust the image for background noise as described above and with respect to FIG. 13 below. The image filtering module may also include a threshold image component, a component labeler, a centroid calculating component, and a LED isolator component. Each of these components can include a combination of software and/or hardware adapted to perform the steps of FIG. 13 as described below.

With regard to the position calculating module 164, this module can be adapted to determine the position and orientation of a vehicle from the two-dimensional representation of the vehicle received from the detection device 142 and based on the known configuration of position indicators 128 on the vehicle. As such, the position calculating module can be configured to perform the method steps described with respect to method step 12 of FIG. 9 and more particularly, the detailed portions of this step as shown in FIG. 14 described below. As such, the position calculating module 164 can include an assumption application component, a processing component, and a result component. Each of these components can include a combination of software and/or hardware adapted to perform the steps depicted in FIG. 14 as described below.

With regard to the control development module 166, it is first noted that this module can be located within the computation device 124 in addition to or in an alternative to being located within the computation device 144. In either or both cases, the control development module can be adapted to compare the calculated position of the vehicle to the desired position of the vehicle and provide vehicle control component commands for controlling the trajectory or direction of travel of the vehicle. In the case of a UAV, these commands can include aileron, rudder, elevator, and power commands. In other embodiments, the control development module 166 can be adapted to develop commands for corresponding vehicle control components. As such, the control development module 166 can include a plurality of command components adapted for development of commands particular to a given control component of the vehicle. For example, in the case of a UAV, a command component may be provided for each control component. That is, the module 166 may include a aileron command component, a rudder command component, and elevator command component, and a power command component. In the case of a ground operated vehicle, these components of the control development module may include a steering command component, a power command component, and a braking component, for example.

Figure 9:
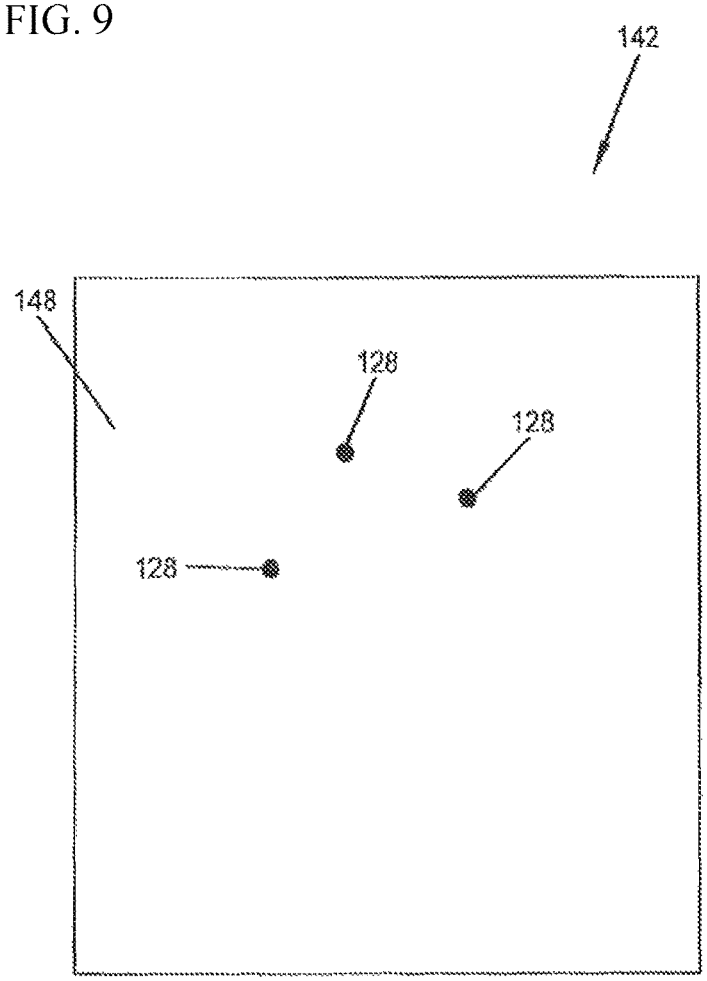
FIG. 9 is a diagram reflecting a method of autonomous vehicle control.
Figure 10:
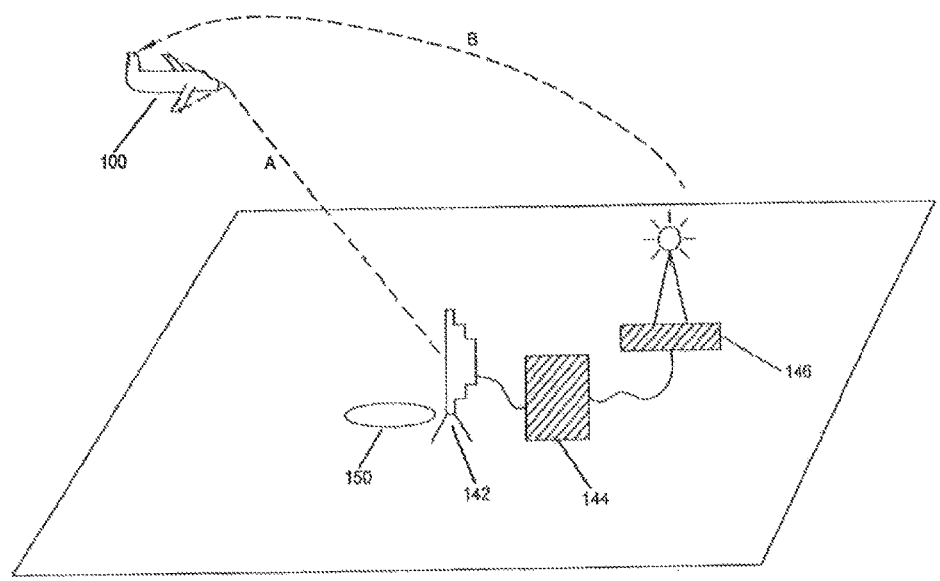
FIG. 10a-10d are exemplary images captured by a detection device of the system of FIG. 2.
Figure 13:
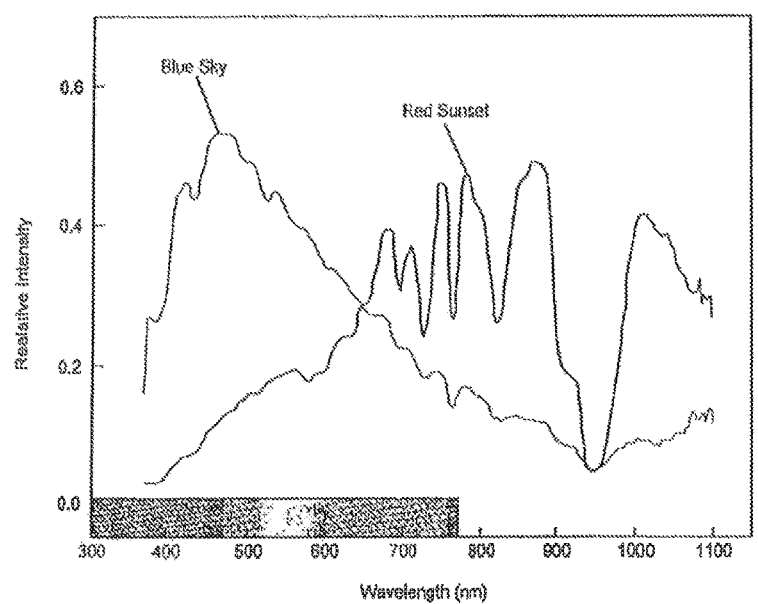
FIG. 13 depicts a detailed portion of the method of FIG. 9 relating to detecting position indicators.

With continued reference to the computer or computation device 144, FIG. 13 shows a more detailed method of displaying an image 11, as originally shown in FIG. 9. Having captured the image (41), the background subtraction component can subtract the background (that which excludes the detected point sources) (42) using a reference image or any other known technique. Then, a threshold image component may create a threshold image (43) from the brightest remaining pixels. The point sources remaining on the image may then be digitally labeled buy a component labeler with their respective two dimensional (x,y) coordinates (44). In some embodiments, the centroids of the point sources, if they appear larger than one pixel, may be calculated (45) by a centroid calculating component. Thereby, the LEDs or other point sources of electromagnetic radiation may be mathematically isolated in coordinate space (46), the positions of which may be used to calculate attitude and position (47), and transmit such positional information to the control system on the UAV or further perform control instruction calculations (48).

With particular reference to procedure (43) and thus the functionality of the threshold image component, one particular known method of thresholding is the "peak and valley" method. First, a histogram is taken of the intensity values of the image. Then, the threshold is chosen based on the deepest valley (least frequent intensity) between the two peaks (most occurring intensities) in the histogram. Other known methods include erosion and dilation. With particular reference to procedure (44) and thus the functionality of the component labeler, labeling may be accomplished in accordance with any known technique, including that described in "A linear-time component-labeling algorithm using contour tracing technique," by Chang et al. With particular reference to procedure (45) and thus the functionality of the centroid calculating component, centroids may be calculated according to the following "Center of Mass" equation:

$$X_{center} = \frac{\sum_{i=1}^{N} x_i}{N}$$

Wherein N equals the number of pixels. Such summation may be done in parallel with the procedure (44) for efficiency. Alternatively, centroids may be calculated using a "Bounding Box Approximation" equation:

$$X_{center} = \frac{X_{max} + X_{min}}{2}$$

Wherein Xmax and Xmin are the maximum and minimum pixel locations, respectively. Alternatively other methods may be used such as subpixel interpolation and dithering to further increase accuracy.

Figure 14A:
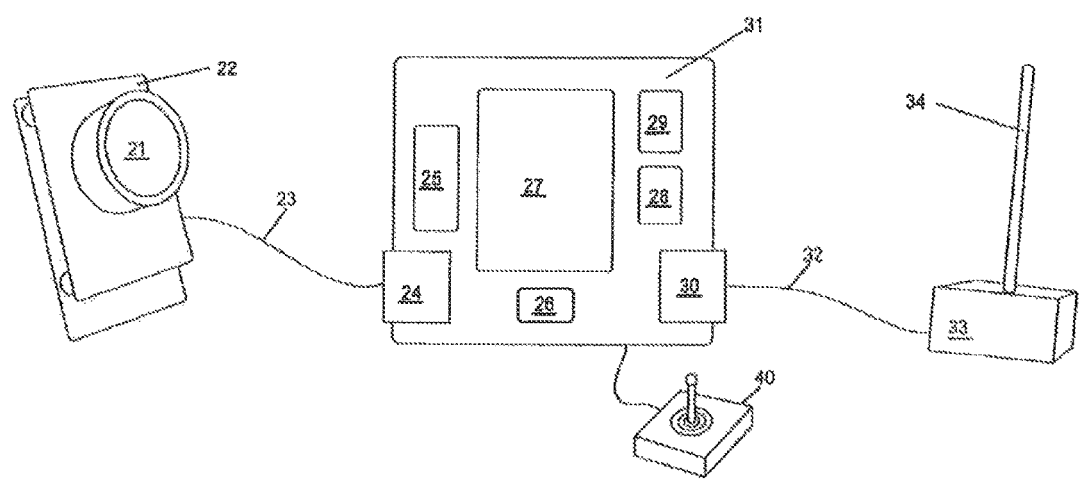
FIG. 14 depicts a detailed portion of the method of FIG. 9 relating to calculating the position of a vehicle.
Figure 14B:
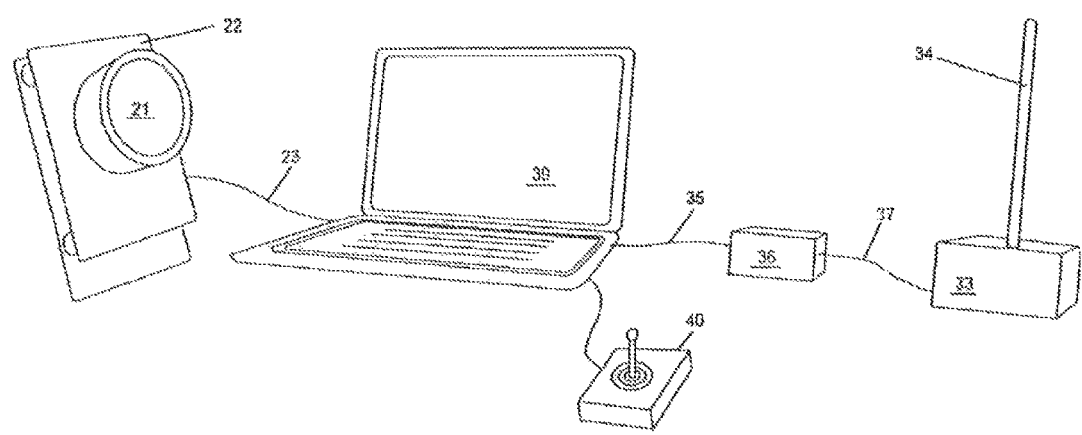
Figure 14C:
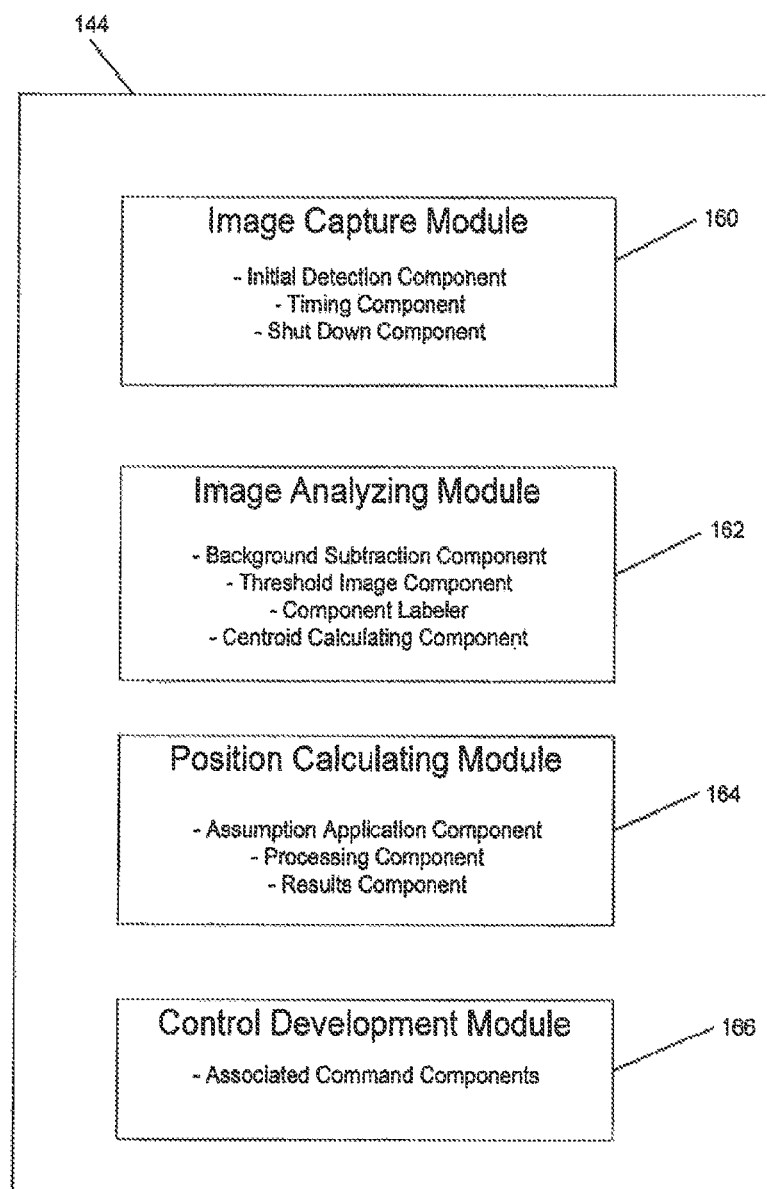
Figure 15:
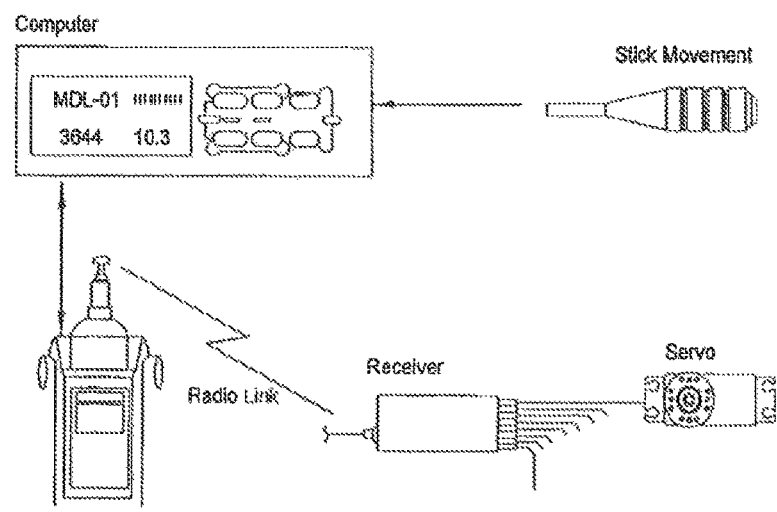
FIG. 15 is a schematic diagram of a the first and second subsystem of the system of FIG. 2.

Referring now to FIG. 14, a more detailed chart is shown relating to calculating the position of an object 100, previously referred to as method step 12 on FIG. 9. As previously discussed, positional information may be determined based on the detected positions of position indicators 128, and the position of those position indicators 128 on the exterior of the vehicle. Such calculation may be made in any manner known to those of skill in the mathematical arts. In some embodiments, the mathematical calculations may comprise linear approximations. As depicted in FIG. 14, such a linear approximation may generally comprise identifying the reference points (50), decoupling the points into 3 orthogonal planes (51) (one for each dimension of movement in space), calculating the angles on the planes, based on the point coordinates and the known configuration of the points on the vehicle (52), recombining the three linear dimensional approximations into a three-dimensional orientation and position (53), and transmitting such information to a vehicle control algorithm (54). This control algorithm may be located in the control system on the vehicle or in the computation device connected to the detection device. The assumption application component of the position calculating module 164 can allow for decoupling the points into the three orthogonal planes by applying boundary assumptions. The processing component can then calculate the angles on each of the three orthogonal planes, and the results component can recombine the three linear dimensional approximations into a solution defining the three dimensional orientation and position of the vehicle.

With particular regard to calculating the position of a vehicle in procedures 51-53 above, some additional information regarding the behavior of a three dimensional object in free space can be provided. The behavior of a 3 dimensional object in free space can often occur about a centralized point and the centralized point is most often the center of mass. Free space can be defined as a medium which is uniformly unrestrictive in all directions such as air, space, water, etc. The motion of an object being limited to motion about a centralized point can allow for decoupling of the objects orientation into three orthogonal planes intersecting at the centralized point or the center of mass as noted in FIG. 14. This can occur through the use of reference points such as point sources associated with the orientation of the object. Where the reference points are not positioned so as to be coaxial to any single axis, the orientation of the object can be determined. This determination can be most accurate when the reference points are further from the center of mass.

In the case of using three reference points, the range of rotations of the object can be more limited and efforts to determine the three dimensional orientation from an arbitrary position will still yield multiple solutions. However, where the variables being used to solve for the position are limited, the solution can be obtained more quickly and without multiple solutions. For example, bounding conditions in the case of an aircraft conducting terminal guidance for landing can be based on the knowledge of the orientation bounds of the aircraft. In the case of three reference points for the aircraft landing scenario, it can be assumed that the aircraft will not exceed +/−90 degrees of yaw in relation to a detection device and further that it will not be inverted on approach. It is noted, however, that even if these bounds are exceeded, there are control methods can be implemented to determine the orientation by observing the behavior of the object in subsequent frames. That is, for example, if the orientation calculation leaves the option for an upright and an inverted orientation and the airplane reacts in a downward direction due to a control command causing the elevator to create upward motion, the aircraft can be then found to be inverted. However, these assumptions regarding yaw and an upright approach allow for solving for the position with a single image rather than images over time. Additionally, it is possible to use more reference points and other methods such as using methods to individually distinguish each marker through frequency modulation or using wavelength filtering.

In cases other than aircraft other assumptions can be made. For example, in the case of an object that is not in free space having a bounded barrier such as an object sitting on the ground, the orientation behavior can be different. This can further simplify the orientation calculation. For example, if the ground surface being encountered is generally flat (e.g., a floor of a building) the orientation can be bounded by the ground or a floor. In these cases a more simplified approach can include breaking the analysis into two orthogonal planes which are orthogonal to the grounding plane thus being simpler than the three orthogonal plane approach noted in FIG. 14.

In the case of any vehicle control situation, one set of assumptions can relate to the dimensions and characteristics of the vehicle being controlled. For example, where reference points are positioned on the vehicle, the reference points can be placed in known positions relative to the center of mass thereby allowing determination of the vehicle orientation based on these reference point locations and orientation. Additionally, in cases where the currently disclosed methods are used in a sensing and avoiding context, for example, the goal may include controlling the behavior of a vehicle where a detection device is positioned on the vehicle. In these circumstances, the detection device may be able to sense or see other objects without knowing their dimensions or characteristics and yet plot a trajectory for the vehicle to avoid the objects.

Accordingly, a linear approximation may comprise a bounded (using boundary assumptions) linear calculation using a Taylor series expansion. As discussed and will be appreciated by those skilled in the art, the minimum number of data points required to approximate the positional orientation, or "pose", of a three dimensional object that is free to move and rotate in three dimensions and about three axes respectively, is three points. In order to achieve the greatest positional accuracy, these points may be as far from the center of gravity (CG) of the object. In some embodiments, these points can also be coaxial to the axes of rotation. However, in other embodiments the points can be mathematically transformed to points falling on the axes as long as all three do not coexist on a single axis of rotation.

As previously discussed, there are several methods which exist to calculate a three dimensional pose. One computational difficulty that may be encountered is that there is always at least one more unknown variable than there are equations. Using linear approximations to solve for one unknown variably allows the remaining equations to be solved in a traditional manner, thereby evening the number of unknown variables to the number of equations required to be solved.

In order to use such a linear approximation, several mathematical boundary assumptions may be made. Generally, the fewer reference points there are, the more bounded the conditions may need to be for a solution to be available. Additionally, the analysis time can be greater where fewer boundary conditions are known or assumed and the time to determine a solution can be a factor in situations such as landing an aircraft, whereas, other situations such as analyzing a stationary object may not be as concerned with time. In the latter case, multiple images may be used and/or fewer boundary conditions may be assumed.

As eluded to above, the assumptions can be based on the situation involving landing of a UAV. Alternatively, these assumptions may be applied to the control of any vehicle in two or three dimensions. In the case of an aircraft, three non-collinear reference points are sufficient with the below boundary conditions to determine an orientation and position.

In one embodiment, the assumption application component of the position calculating module can focus the scope of the solution to the linear equations by applying the following assumptions. First, it may be assumed that the airplane will be approaching the detection device 142 from the front. That is, the UAV can be programmed to approach a landing area from a given direction and the detection device 142 can be positioned to pickup UAV's as they approach. Second, it may be assumed that the airplane will be oriented right side up with a roll angle less than 90 degrees to either side. This assumption is based on knowledge of the UAV flight capabilities as well as general assumptions regarding their general attitude status as they approach a landing area. Third, it may be assumed that the actual dimensions of the UAV are known as well as the location and distances from the CG of the 3 reference points. This requires that the dimensions and orientations of the position indicators 128 be placed in particular locations relative to one another and in particular locations relative to the plane and further that this information be input into the computer 144 or computation device 124. Fourth, it may be assumed that because the reference points on the wing are close to being co-axial with the CG, then the only transformation that affects their perceived distance is yaw. Reference points may also be mathematically transformed from other positions, not on or near an axis of rotation, to positions on the wing. It is therefore also assumed that airplane pivots about its CG. These assumptions are based on knowledge of general airplane construction and flight behavior. Fifth, it may be assumed that positional angles of the detected position indicators 128 will be calculated in relation to the display image plane of the detection device, and not in relation to "real world" coordinates. This is due to the fact that the display image plane is not really a plane but a bounded section of a sphere. Therefore, the display image plane changes as the position of the aircraft changes in relation to the camera. It will only change as a two dimensional approximation due to the up, down, left, and right changes of the aircraft, but not forward and backwards.

These assumptions help establish the boundary conditions of the positional calculations and allow for more quickly determining the position of the UAV. Similar assumptions can be made for other vehicles depending on the nature of the vehicle and the conditions within which the vehicle is being used. For example, for a UGV, assumptions relating to the vehicle 100 being upright and within a certain range of roll angle could be assumed, etc. It is also noted that the assumption application component may or may not be provided depending on the nature of the system. That is, where a particular system is configured for use in a particular application, the system may be loaded with a set of linear equations, or other three dimensional processing analysis, that has already been limited by a list of assumptions similar to those listed above. In this embodiment, the processing component of the position calculating module may be loaded with a bounded set of linear equations, or other bounded three dimensional processing analysis, applicable to a particular application.

Having applied the assumptions, the processing component of the position calculating module can solve the linear equations to determine certain aspects of the three dimensional orientation and position. For example, in computing the position of a UAV in accordance with the present disclosure, the aircraft may first be mathematically "unyawed" in order to determine the distance between the wingtips as detected by the detector. Once this distance is calculated, the range of the aircraft may be calculated. Then, once the range is known, this variable may be used with the standard linear equations, discussed above, in order to solve for the aircraft position.

In particular, the yaw of the aircraft may be calculated using the following equation:

$$\text{Yaw} = \tan^{-1}\frac{a}{D/2} = \sin^{-1}\frac{a}{D'/2}$$

Wherein D is the observed distance between wingtip reference points, D' is the actual distance between the wingtips, and 'a' is the observed distance between the tail reference point and the center point between the wingtips. For a generalized three dimensional problem, D can be the distance between two reference points which are either coaxial or mathematically transformed to be coaxial, and 'a' can be the observed distance to a third non-coaxial point.

Then, the range can be calculated using the following equation:

$$D' = focallength \times \frac{ActualWingspan}{Range}$$

Wherein focal length is determined by the lens chosen for the electromagnetic radiation detection device, as discussed above.

With yaw and range known, the remaining variables to be solved for include roll angle and pitch. Roll angle may be calculated using a trigonometric identity, based on the yaw-corrected wingtip points. Specifically:

$$\theta = \arctan\frac{\Delta y}{\Delta x}$$

Wherein theta is the roll angle, and x and y are the corrected wingtip coordinates. Furthermore, pitch may be calculated using the known center point between the wingtips, and the coordinates of the detected point source located on the tail or vertical stabilizer. Specifically:

$$PitchAngel = \sin^{-1}\frac{2F}{D'}$$

Wherein F is the distance from the tail to the center point of the wing.

The results component of the position calculating module can then combine these results to define the orientation and position of the vehicle. Once the position and orientation of the UAV has been determined using the above described equations and calculation methods, position or control information may be developed and transmitted to the UAV, and the control system on the UAV may make appropriate control inputs to the directional controls of the UAV to achieve or maintain a localizing course to the desired point, for example, the landing area where the detection device has been positioned. This process may be continually repeated and in this manner, a UAV may be autonomously controlled to the point of landing, so as to enable the UAV to be usable for subsequent applications/missions.

With specific reference now to the directional control system, as embodied in a UAV, one objective may be to achieve and maintain an acceptable glide slope for the UAV descent which will result in a safe and successful approach to landing. In some applications, it may be desirable for the glide slope to be configured so as to allow the UAV to clear a vertical wall of approximately 12 feet at a range of approximately 500 feet. With the assumption that the components of the second sub-system are placed on flat ground, a minimum glides slope of 3.4 degrees is required to safely clear the wall in this manner. However, an excessively steep glide slope may result in a vertical velocity that would cause stress upon the UAV at touchdown. Therefore, a glide slope of approximately between 3.4 degrees to 15 degrees may be desirable, and more particularly a glide slope of 6 degrees may be desirable. In other embodiments, steeper or less steep glide angles can be selected depending on the conditions and surrounding necessary to land the UAV safely and without damage. In some embodiments, the glide angle can be adjusted as the UAV approaches a landing area so as to feather the approach and provide for a softer landing. The glide angle may therefore be configurable to allow for precision landing at any point in front of the detection device and within the detection range of the detection device.

As previously mentioned, there are four control surfaces that exist on the UAV witch determine the UAV's three dimensional trajectory. Referring once again to FIG. 3, the ailerons 106 on the back of each wing mainly affect the bank angle. Their movements may be tied together, so as the left aileron rotates down the right aileron rotates up at exactly the same rate. Thus, the left aileron 106 angle may always be the negative of the right aileron 106 angle with respect to the wing. The elevator 102 on the back of the horizontal stabilizer mainly affects the UAV's pitch, moving the nose up or down with respect to the UAV's center of gravity. The rudder 104 on the back of the vertical stabilizer primarily affects the yaw of the UAV. Lastly, the powerplant 108 affects overall velocity.

The directional control system may comprise four separate parallel closed loop systems, each controlling individual control surfaces of the airplane; ailerons, elevator, rudder, and powerplant. Each system may have both inner and outer loop components running in parallel which are then output to the control surface as a weighted sum. This approach to controlling the UAV flight may optimize control for optical sensing.

More particularly, aileron controls may be a weighted summation of bank error based on a constant desired bank of zero degrees, horizontal velocity on the display image plane displacement, and an integration of desired bank error. Elevator controls may be based on a desired pitch of the UAV relative to the radial position vector from the center of the image plane to the normal plane of the aircraft. This may give result in pitch that varies the true pitch of the aircraft with vertical position on the display image plane. Rudder controls may also be a weighted summation of the following components: the UAV's yaw relative to the radial position vector from the center of the display image plane to the normal plane of the UAV, the integration of the yaw error, and the product of the horizontal velocity vector in the image plane with the aircraft horizontal displacement in the image plane and the calculated aircraft range. Throttle controls may be a weighted sum of the vertical displacement of the UAV in the image plane and the vertical velocity of the aircraft in the image plane. Other directional control algorithms are known in the art, and may be employed in connection with the directional control system in alternative embodiments.

Referring again to FIGS. 12a and 12b, a control stick 40 may be operably connected to the computer or computation device 144. A control stick 40 may be required where remote manual operation of the UAV is desired during certain portions of flight. The control stick 40 motions may be electronically sent to the computer or computation device 144, indicating desired control changes in the UAV. Alternatively, during autonomous control, the computer or computation device 144 may generate its own control or position instructions/information, as previously discussed. The computer or computation device 144 may be operably connected to a transmitter 146 in a manner, for example, as shown in greater detail in FIGS. 12a-b. The transmitter 146 transmits a radio or other electronic signal 41 comprising the aforementioned position or control information. Such information in the signal 41 is receivable by a receiver 122 located in the first sub-system 120 of the UAV. The receiver 122 may be operably connected to the directional control system 126 of the UAV, which may comprise, for example, various actuator/cable assemblies, servos, hydraulics and air/fuel mixture regulators, among others.

In one particular embodiment, the transmitter 146 may be a Futaba 6EX-PCM radio system. Such system is a 72 MHz radio system that uses Pulse Code Modulation. It sends information via a binary coded signal (the bit length being determined by the number of channels) to the receiver 122, followed by a 16 bit checksum. Pulse Code modulation may be desirable as the form of transmission because it is less prone to signal noise or error, although it will be appreciated that any form of transmission may be used in accordance with the present disclosure. As will be appreciated by those skilled in the art, closed-loop feedback control systems may have an inherent latency between detection and response. Such latency may cause instability in the system. In selecting the particular components of the system as shown in FIG. 14 for use with a particular application, the following considerations may be taken into account which may reduce latency. 1) Employing Pulse Position Modulation transmissions as opposed to Pulse Coded Modulation; 2) using fewer channels; 3) using digital servos; or 4) using a 2.4 GHz spread spectrum radio (e.g., a Futaba 2.4 GHz spread spectrum radio system).

With continued reference to the directional control system 126, in order to control the control component positions, e.g. servo positions, on the UAV (which subsequently control the UAV's movements through the ailerons, elevator, rudder, and throttle), a Futaba-specific Pulse Position Modulated (PPM) signal may be sent through the trainer port of our Futaba radio transmitter (or other similar signal in embodiments not using Futaba radio systems). The PPM signal may be an approximately 0 to 5 Volt digital signal with the following format: 1) An approximately 9 ms high synchronizing pulse. 2) A low pulse lasting for approximately 400 μs. 3) Up to 8 channels with the following format: a high pulse lasting approximately from 0.680 ms to 1.52 ms, with approximately 1.12 ms being at a neutral position, indicating the servo position of that particular channel, followed by a low pulse of 400 μs. A timer interrupt with a period of 10 μs may be used to output the desired PPM signal through a output pin on the BF561 (or similar component of embodiments using a computation device other than the BF561). If any signal noise is experienced during such transmissions, shielded wires or copper foil may be employed on the electrical components of the system in order to mitigate such noise.

Although the present disclosure has been described with reference to various embodiments, persons skilled in the art will recognize that changes may be made in form and detail without departing from the spirit and scope of the invention. The techniques of this disclosure may be embodied in a wide variety of devices or apparatuses. Any components, modules, or units have been described to emphasize functional aspects and does not necessarily require realization by different hardware units, etc.

Accordingly, the techniques embodied/described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described herein. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

If implemented in software, the software code may be initially stored on a computer readable medium, and may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Many other aspects of this disclosure will become apparent from the teaching below. Nothing in this disclosure should be construed as any admission regarding prior art or known systems. Any discussion of background material is provided for context, and does not necessarily mean that such background material was known, or that problems akin to background material were known.

What is claimed is:

1. An autonomous vehicle configured to be localized to a target area by a detection system, the autonomous vehicle comprising:
    at least one directional control component;
    a position indicator configured to associate the vehicle in a three-dimensional configuration, the configuration having a relationship to the vehicle orientation;
    a receiver configured to receive a signal from the detection system and filter the information therefrom;
    an inertial measurement unit configured to measure vehicle orientation; and
    a control system in communication with the detection system and the inertial measurement unit, the control system configured to control the at least one directional control component, the control being based on the vehicle orientation measured by the inertial measurement unit and the information received from the receiver.

2. The autonomous vehicle of claim 1, wherein the autonomous vehicle is one of an autonomous underwater vehicle, an unmanned ground vehicle, or an unmanned aerial vehicle.

3. The autonomous vehicle of claim 1, wherein the at least one directional control component is at least one of an elevator, a rudder, a fin, an aileron, an accelerator, a decelerator, a steering mechanism, or a powerplant.

4. The autonomous vehicle of claim 1, wherein the position indicator emits electromagnetic radiation, the electromagnetic radiation being at least one of microwave, terahertz radiation, infrared radiation, visible light, ultraviolet radiation, X-ray, or gamma ray.

5. The autonomous vehicle of claim 1, wherein the position indicator is located at the greatest distance from the center of gravity of the autonomous vehicle.

6. The autonomous vehicle of claim 3, further comprising three or more position indicators.

7. The autonomous vehicle of claim 1, further comprising a computation device in communication with the detection system and configured to compute a position of the vehicle based on a detected position indicator and the relationship of the position indicator configuration to the vehicle orientation measured by the inertial measurement unit.

8. A detection system for localizing an autonomous vehicle to a target area,
    the detection system comprising:
        a detection device adapted for association with the target area and configured to detect the autonomous vehicle and capture at least a portion of the autonomous vehicle in an image;
        a computation device including:
            an image capture module configured to control the detection device to capture an image,
            an image analyzing module configured to analyze the image, and
            a position calculating module configured to compute a position of the autonomous vehicle based on the image; and
        a transmitter in communication with the computation device and configured to receive information from the computation device, produce a signal carrying the information, and transmit the signal to the autonomous vehicle.

9. The detection system of claim 8, wherein the image capture module is further configured to control the detection device to detect the autonomous vehicle by detection of one or more position indicators on the autonomous vehicle, and the position calculating module is further configured to compute a position of the autonomous vehicle based on a relationship of the one or more position indicators to the orientation of the autonomous vehicle.

10. The detection system of claim 8, wherein the computation device further includes a control development module configured to compare the computed position of the autonomous vehicle to a desired position of the autonomous vehicle and generate a control command for the autonomous vehicle.

11. In combination, an autonomous vehicle configured to be localized to a target area by a detection system, and a detection system for localizing the autonomous vehicle to the target area;
    wherein the autonomous vehicle comprises:
        at least one directional control component;
        a position indicator configured to associate the vehicle in a three-dimensional configuration, the configuration having a relationship to the vehicle orientation;
        a receiver configured to receive a signal from the detection system and filter the information therefrom;
        an inertial measurement unit configured to measure vehicle orientation; and
        a control system in communication with the detection system and the inertial measurement unit, the control system configured to control the at least one directional control component, the control being based on the vehicle orientation measured by the inertial measurement unit and the information received from the receiver; and
    wherein the detection system comprises:
        a detection device adapted for association with the target area and configured to detect the autonomous vehicle and capture at least a portion of the autonomous vehicle in an image;

a computation device including:
- an image capture module configured to control the detection device to capture an image,
- an image analyzing module configured to analyze the image, and
- a position calculating module configured to compute a position of the autonomous vehicle based on the image; and a transmitter in communication with the computation device and configured to receive information from the computation device, produce a signal carrying the information, and transmit the signal to the autonomous vehicle.

12. The combination of claim 11, wherein the position indicator of the autonomous vehicle emits electromagnetic radiation, the electromagnetic radiation being at least one of microwave, terahertz radiation, infrared radiation, visible light, ultraviolet radiation, X-ray, or gamma ray.

13. The combination of claim 11, wherein the position indicator of the autonomous vehicle is located at the greatest distance from the center of gravity of the autonomous vehicle.

14. The combination of claim 11, wherein the image capture module of the computation device is further configured to control the detection device to detect the autonomous vehicle by detection of the position indicator of the autonomous vehicle, and the position calculating module is further configured to compute a position of the autonomous vehicle based on a relationship of the position indicator to the orientation of the autonomous vehicle.

15. The combination of claim 11, wherein the computation device further includes a control development module configured to compare the computed position of the autonomous vehicle to a desired position of the autonomous vehicle and generate a control command for the autonomous vehicle.

* * * * *